(12) United States Patent
Yamaguchi et al.

(10) Patent No.: US 8,325,105 B2
(45) Date of Patent: Dec. 4, 2012

(54) SCREEN TRANSMISSION DEVICE, SCREEN DISPLAY METHOD AND COMPUTER READABLE MEDIUM

(75) Inventors: Shogo Yamaguchi, Kawasaki (JP); Shinya Murai, Kawasaki (JP); Tsuyoshi Hioki, Yokohama (JP); Hajime Yamaguchi, Kawasaki (JP); Mitsue Fujinuki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 929 days.

(21) Appl. No.: 11/705,600

(22) Filed: Feb. 13, 2007

(65) Prior Publication Data

US 2007/0234222 A1     Oct. 4, 2007

(30) Foreign Application Priority Data

Mar. 29, 2006   (JP) .................................. 2006-91826

(51) Int. Cl.
*G09G 5/00* (2006.01)
(52) U.S. Cl. ........... 345/1.1; 345/1.2; 345/1.3; 715/761; 715/764; 715/781
(58) Field of Classification Search ............ 345/1.1–1.3; 715/761, 764, 779, 781; 719/318
See application file for complete search history.

(56) References Cited

U.S. PATENT DOCUMENTS

| | | | | |
|---|---|---|---|---|
| 6,509,911 B1* | 1/2003 | Shimotono | .................... | 715/761 |
| 6,522,309 B1* | 2/2003 | Weber | ............................ | 345/1.1 |
| 2003/0197659 A1* | 10/2003 | Arai | ................................ | 345/1.1 |
| 2003/0231143 A1* | 12/2003 | Nakamura et al. | ............. | 345/1.1 |
| 2004/0125044 A1* | 7/2004 | Suzuki | ............................ | 345/1.1 |
| 2005/0093868 A1* | 5/2005 | Hinckley | ....................... | 345/502 |
| 2005/0253775 A1* | 11/2005 | Stewart | .......................... | 345/1.1 |
| 2006/0001593 A1* | 1/2006 | Baudisch | ....................... | 345/1.1 |

FOREIGN PATENT DOCUMENTS

| | | |
|---|---|---|
| JP | 2003-061140 | 2/2003 |
| JP | 2003-280783 | 2/2003 |
| JP | 2004-023317 | 1/2004 |
| JP | 2004-318207 | 11/2004 |

OTHER PUBLICATIONS

Office Action in Japanese Application No. 2006-091826 dated Aug. 11, 2009 and English-language translation thereof.
Office Action in Japanese Patent Application No. 2006-091826, dated Apr. 16, 2010, and English-language translation.

* cited by examiner

*Primary Examiner* — Lun-Yi Lao
*Assistant Examiner* — Priyank Shah
(74) *Attorney, Agent, or Firm* — Nixon & Vanderhye, P.C.

(57) ABSTRACT

According to an aspect of the present invention, there is provided with a screen transmission device, including: a first receiver configured to receive usage state information indicating usage states of a plurality of screen display devices by a user from each the screen display device; a second receiver configured to receive a message of requesting start-up of a window from the screen display device out of the screen display devices; a determiner configured to determine a screen display device on which the window is to be started up out of the plurality of screen display devices based on the usage states of each the screen display device; a screen data generator configured to generate screen data of the window; and a transmitter configured to transmit the screen data of the window to the screen display device determined by the determiner.

7 Claims, 23 Drawing Sheets

FIG. 6 DISPLAY EXAMPLE OF INPUT DIALOG

PROCESSING OF SCREEN TRANSMISSION DEVICE
WHEN ADDING SCREEN DISPLAY DEVICE

FIG. 8   EXAMPLE OF INITIAL SCREEN

| DISPLAY ID | ADDRESS | RESOLUTION | NUMBER OF COLORS | USER NAME | HAND-HELD STATE INFORMATION |
|---|---|---|---|---|---|
| 1 | xxx.xxx.xxx.xxx | 800x600 | 24bit | yamaguchi | NO |
| 2 | yyy.yyy.yyy.yyy | 1024x768 | 24bit | yamaguchi | YES |

EXAMPLE OF DISPLAY DEVICE LIST
(BEFORE ADDING THIRD ONE)

FIG. 9

| DISPLAY ID | ADDRESS | RESOLUTION | NUMBER OF COLORS | USER NAME | HAND-HELD STATE INFORMATION |
|---|---|---|---|---|---|
| 1 | xxx.xxx.xxx.xxx | 800x600 | 24bit | yamaguchi | NO |
| 2 | yyy.yyy.yyy.yyy | 1024x768 | 24bit | yamaguchi | YES(LEFT SIDE) |
| 3 | zzz.zzz.zzz.zzz | 1024x768 | 24bit | yamaguchi | NO |

EXAMPLE OF DISPLAY DEVICE LIST
(AFTER ADDING THIRD ONE)

FIG. 10

| DISPLAY ID | ADDRESS | RESOLUTION | NUMBER OF COLORS | USER NAME | HAND-HELD STATE INFORMATION |
|---|---|---|---|---|---|
| 1 | xxx.xxx.xxx.xxx | 800x600 | 24bit | yamaguchi | YES(LEFT SIDE) |
| 2 | yyy.yyy.yyy.yyy | 1024x768 | 24bit | yamaguchi | NO |
| 3 | zzz.zzz.zzz.zzz | 1024x768 | 24bit | yamaguchi | NO |

EXAMPLE OF DISPLAY DEVICE LIST
(BEFORE CHANGING HAND-HELD STATE)

FIG. 15

| DISPLAY ID | ADDRESS | RESOLUTION | NUMBER OF COLORS | USER NAME | HAND-HELD STATE INFORMATION |
|---|---|---|---|---|---|
| 1 | xxx.xxx.xxx.xxx | 800x600 | 24bit | yamaguchi | NO |
| 2 | yyy.yyy.yyy.yyy | 1024x768 | 24bit | yamaguchi | NO |
| 3 | zzz.zzz.zzz.zzz | 1024x768 | 24bit | yamaguchi | YES(LEFT SIDE) |

EXAMPLE OF DISPLAY DEVICE LIST
(AFTER CHANGING HAND-HELD STATE)

FIG. 16

FIG. 17 EXAMPLE OF MENU LIST SCREEN

FIG. 18 DISPLAY EXAMPLE OF IMAGE EDITOR SCREEN

| DISPLAY ID | ADDRESS | RESOLUTION | NUMBER OF COLORS | USER NAME | LATEST ACCESS INFORMATION |
|---|---|---|---|---|---|
| 1 | xxx.xxx.xxx.xxx | 800x600 | 24bit | yamaguchi | NO |
| 2 | yyy.yyy.yyy.yyy | 1024x768 | 24bit | yamaguchi | NO |
| 3 | zzz.zzz.zzz.zzz | 1024x768 | 24bit | yamaguchi | YES |

EXAMPLE OF DISPLAY DEVICE LIST (LATEST ACCESS)

FIG. 19

| DISPLAY ID | ADDRESS | RESOLUTION | NUMBER OF COLORS | USER NAME | NUMBER OF TIMES OF USER ACCESS |
|---|---|---|---|---|---|
| 1 | xxx.xxx.xxx.xxx | 800x600 | 24bit | yamaguchi | 38 |
| 2 | yyy.yyy.yyy.yyy | 1024x768 | 24bit | yamaguchi | 13 |
| 3 | zzz.zzz.zzz.zzz | 1024x768 | 24bit | yamaguchi | 5 |

EXAMPLE OF DISPLAY DEVICE LIST (ACCESS FREQUENCY)

FIG. 20

| DISPLAY ID | ADDRESS | RESOLUTION | NUMBER OF COLORS | USER NAME | NUMBER OF SCREEN UPDATES |
|---|---|---|---|---|---|
| 1 | xxx.xxx.xxx.xxx | 800x600 | 24bit | yamaguchi | 44 |
| 2 | yyy.yyy.yyy.yyy | 1024x768 | 24bit | yamaguchi | 102 |
| 3 | zzz.zzz.zzz.zzz | 1024x768 | 24bit | yamaguchi | 11 |

EXAMPLE OF DISPLAY DEVICE LIST
(SCREEN UPDATE FREQUENCY)

FIG. 21

FIG. 22 EXAMPLE OF WRITE-INHIBIT BUTTON

| DISPLAY ID | ADDRESS | RESOLUTION | NUMBER OF COLORS | USER NAME | HAND-HELD STATE INFORMATION | WRITE-INHIBIT |
|---|---|---|---|---|---|---|
| 1 | xxx.xxx.xxx.xxx | 800x600 | 24bit | yamaguchi | NO | NO |
| 2 | yyy.yyy.yyy.yyy | 1024x768 | 24bit | yamaguchi | NO | NO |
| 3 | zzz.zzz.zzz.zzz | 1024x768 | 24bit | yamaguchi | YES(LEFT SIDE) | YES |

EXAMPLE OF DISPLAY DEVICE LIST (WRITE-INHIBIT)

FIG. 23

SCREEN TRANSMISSION DEVICE, SCREEN DISPLAY METHOD AND COMPUTER READABLE MEDIUM

CROSS-REFERENCE TO RELATED APPLICATIONS

This application is based upon and claims the benefit of priority from the prior Japanese Patent Application No. 2006-91826 filed on Mar. 29, 2006, the entire contents of which are incorporated herein by reference.

BACKGROUND OF THE INVENTION

1. Field of the Invention

The present invention relates to a screen transmission device, screen display method and computer readable medium, and more particularly, to a window display position control technology in a multi-display system which displays a computer screen of a PC (Personal Computer) or the like by coordinating a plurality of displays.

2. Related Art

Conventionally, as a system for displaying one computer screen of a PC or the like using a plurality of displays, there is a multi-monitor function supported as standard by Windows (registered trademark). When a display card for multi-monitor is used or a plurality of display cards are pushed into the PC simultaneously and the OS (Operating System) recognizes the plurality of displays, screens are displayed as one big desktop on the plurality of displays. The user can use a wider work space when using a plurality of displays than the case where the user is working only with one display. For example, when the user wants to see a plurality of documents simultaneously, document windows do not overlap with one another or windows are arranged so as not to overlap with one another, and therefore the windows can be displayed simultaneously without being reduced in size.

A system whereby a plurality of displays cooperate with one another for displays is described in JP-A 2003-61140 (KOKAI). According to JP-A 2003-61140(KOKAI), when a display instruction is received from a user, the system judges whether or not all the instructed display contents can be displayed on a full screen at a time. When all the instructed display contents cannot be displayed on the screen at a time, the system searches nearby devices and if it finds them, the system displays one screen using a plurality of devices coordinating with one another.

Furthermore, the system described in JP-A 2004-318207 (KOKAI) automatically collects information on screen creating elements and screen display elements included in a plurality of nearby devices and automatically forms a processing configuration which combines the screen creating elements and screen display elements in user specified order or in a preset priority order.

While a multi-monitor function of Windows presupposes a relatively fixed way of combination between a PC and displays such as a desktop, using the methods described in the above described two patents facilitates the formation of a multi-display environment when a multi-display is necessary at a time of using a portable device or the like.

As described above, the systems described in JP-A 2003-61140(KOKAI) and JP-A 2004-318207(KOKAI) allow a multi-display environment to be easily used even when the apparatus configuration changes frequently such as when portable apparatuses are used. However, when a display is started up in a multi-display environment, which display is started up greatly affects the convenience of the user. For example, in a conventional Windows multi-monitor environment, a completely new window is started up at a primary monitor. When a display to be shown is not a primary monitor, it is necessary to move the window from the primary monitor to a desired display after the window is started up through mouse operation or the like. When the window is started up for the second time, it is started up at the position where it was closed last time, but in an apparatus configuration which changes fast from one moment to another, it would be rather unlikely that the position where the window was closed last time coincides with the desired position.

The system described in JP-A 2003-61140(KOKAI) can display one big screen using a plurality of devices in cooperation, but it does not refer to the position of a window when the window is started up. On the other hand, the system described in JP-A 2004-318207(KOKAI) simplifies or automates the determination of an apparatus configuration but it does not perform control on which apparatus a new window is displayed after the apparatus configuration is determined. In any case, there is a problem that a complicated operation to move the window to a desired display is required to display the window on a desired display when the window is started up.

SUMMARY OF THE INVENTION

According to an aspect of the present invention, there is provided with a screen transmission device, comprising:

a first receiver configured to receive usage state information indicating usage states of a plurality of screen display devices by a user from each screen display device;

a second receiver configured to receive a message of requesting start-up of a window from the screen display device out of the screen display devices;

a determiner configured to determine a screen display device on which the window is to be started up out of the plurality of screen display devices based on the usage states of each screen display device;

a screen data generator configured to generate screen data of the window; and a transmitter configured to transmit the screen data of the window to the screen display device determined by the determiner.

According to an aspect of the present invention, there is provided with a screen display method, comprising:

receiving usage state information indicating usage states of a plurality of screen display devices by a user from each screen display device;

receiving a message of requesting start-up of a window from the screen display device out of the screen display devices;

determining a screen display device on which the window is to be started up out of the plurality of screen display devices based on the usage states of each screen display device;

generating screen data of the window; and transmitting the screen data of the window to the screen display device determined to be started up.

According to an aspect of the present invention, there is provided with a computer readable medium storing a computer program for causing a computer to execute instructions to perform steps of:

receiving usage state information indicating usage states of a plurality of screen display devices by a user from each screen display device;

receiving a message of requesting start-up of a window from the screen display device out of the screen display devices;

determining a screen display device on which the window is to be started up out of the plurality of screen display devices based on the usage states of each screen display device;

generating screen data of the window; and transmitting the screen data of the window to the screen display device determined to be started up.

BRIEF DESCRIPTION OF THE DRAWINGS

FIG. 9 shows an example of a display device list according to the first embodiment;

FIG. 10 shows another example of the display device list according to the first embodiment;

FIG. 15 shows an example of a display device list according to the first embodiment;

FIG. 16 shows another example of the display device list according to the first embodiment;

FIG. 19 shows an example of a display device list according to a second embodiment;

FIG. 20 shows another example of the display device list according to the second embodiment;

FIG. 21 shows an example of a display device list according to a third embodiment;

FIG. 23 shows a further example of the display device list according to the third embodiment.

DETAILED DESCRIPTION OF THE INVENTION

In a multi-display environment in which a plurality of displays that can be held by hand are used simultaneously and even in a situation in which the user is changing the hand held displays one after another, this embodiment detects a display on which the user's attention is focused and automatically controls the position of a window to be newly started up so as to be displayed on the display of the highest attention level to thereby alleviate the burden on the user of window arrangement. Hereinafter, this embodiment will be explained in detail.

First Embodiment

[Determining Display Destination According to Hand-Held State Information]

Figure 1:
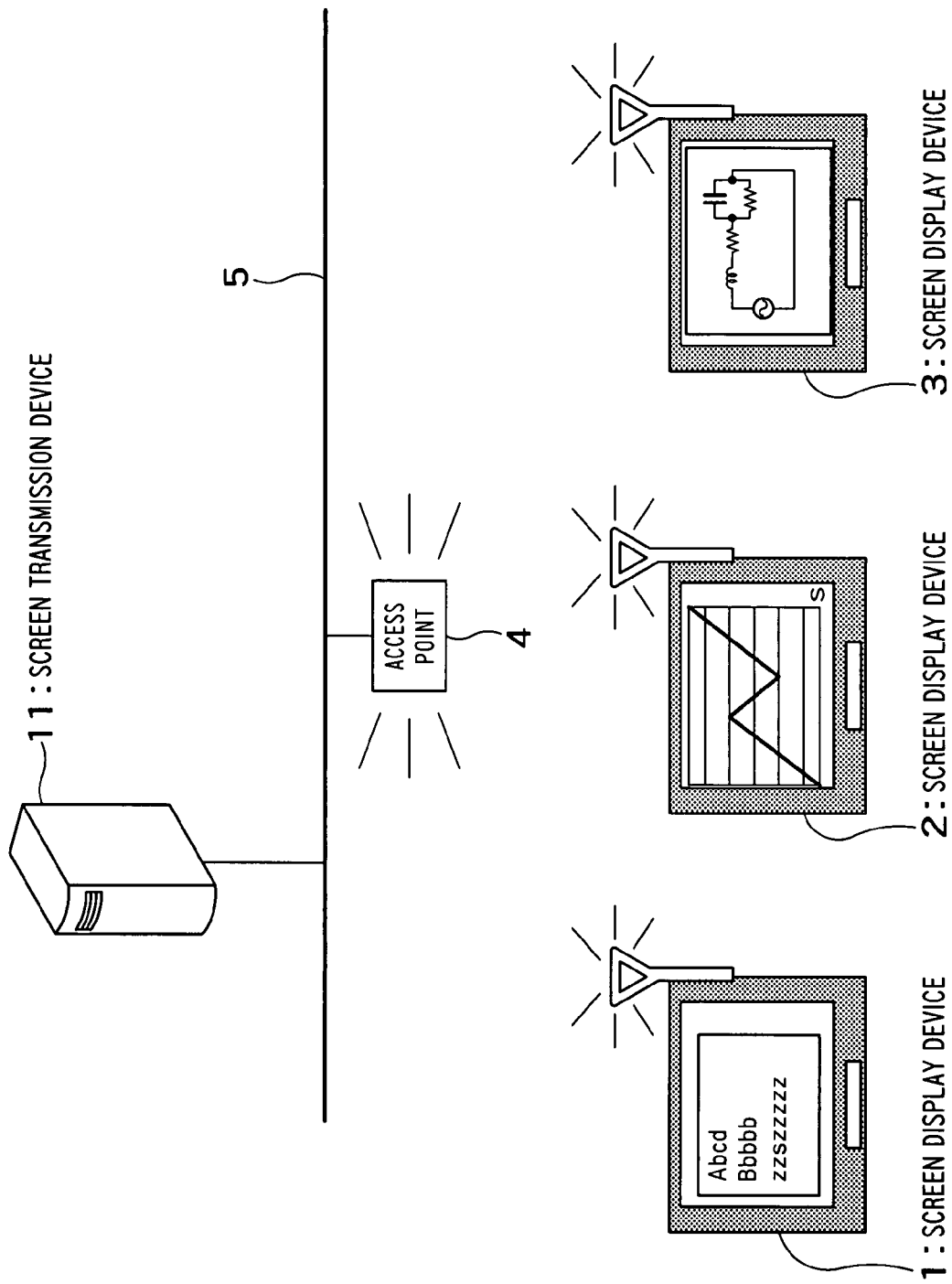
FIG. 1 shows an example of a multi-display system according to a first embodiment.

FIG. 1 shows an example of a multi-display system of this embodiment. A plurality of screen display devices 1 to 3 are connected to a screen transmission device 11 which is connected to a wired network 5 through a wireless access point 4. The mode of connection between the screen transmission device and the screen display device is not particularly limited. For example, there are various types of wireless connection such as an ad hoc mode of wireless LAN (Local Area Network) and Bluetooth™, infrared rays and these devices may also be directly connected by radio without using any wired network. Furthermore, the screen display devices and the screen transmission device may not necessarily be geographically close to each other and may be located far from each other. The screen display devices 1 to 3 in the figure show a situation in which different application screens (screen display device 1 shows a text editor, screen display device 2 shows a graph application and screen display device 3 shows an image display application) are displayed.

The screen transmission device 11 generates screen data for the screen display devices 1 to 3 and transmits them. The screen display devices 1 to 3 display received screen data. The user proceeds with work using the plurality of screen display devices 1 to 3.

Figure 2:
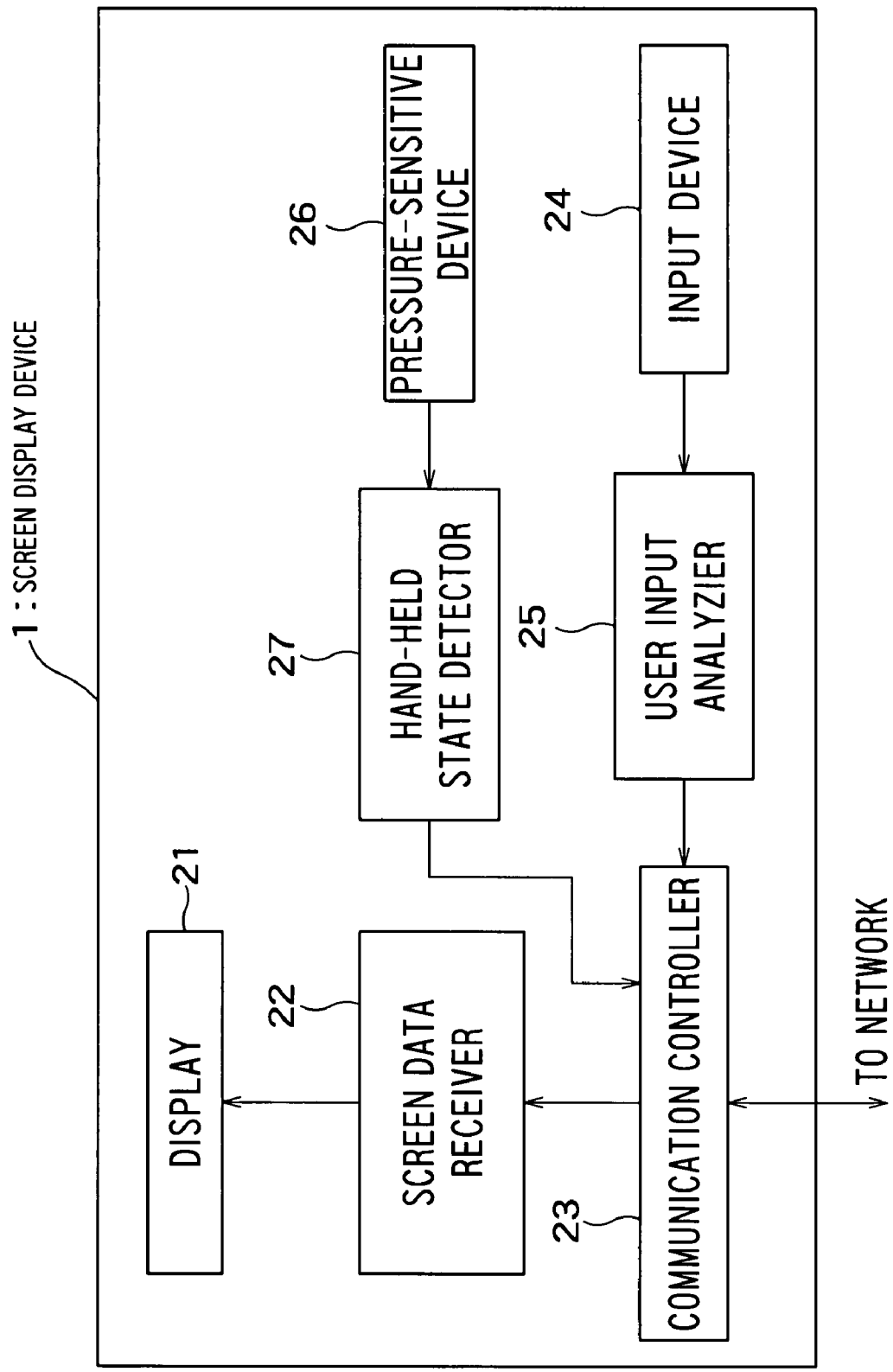
FIG. 2 shows an example of the block configuration of a screen display device according to the first embodiment.

FIG. 2 shows an example of the block configuration of the screen display device 1 of this embodiment. Suppose the screen display devices 2 and 3 also have the configurations identical to that of the screen display device 1. The figure shows a display 21, a screen data receiver 22, a communication controller 23, an input device 24, a user input analyzer 25, a pressure-sensitive device 26 and a hand-held state detector 27. These elements 21-27 may be implemented by causing a processor mounted in a computer device to execute a program stored in a computer readable medium.

The display 21 displays a screen composed by the screen data receiver 22.

The communication controller 23 transmits/receives data to/from a network. The communication controller 23 needs to establish a connection with a screen transmission device which becomes the destination device before sending/receiving data. TCP/IP is generally used as a communication protocol for transmission but it goes without saying that the communication protocol is not limited to this. Furthermore, it is necessary to specify the screen transmission device which becomes the destination device, but the method of specification is not particularly limited and when, for example, TCP/IP is used, the user may specify an IP address or if there is an environment in which a DNS (Domain Name Server) is available, a host name may be specified, the DNS may convert the host name to an IP address and then form a communication channel. The data to be transmitted includes a user operation event which is sent from the user input analyzer 25 and hand-held state information which is sent from the hand-held state detector 27 and the communication controller 23 transmits the user operation event and hand-held state information to the specified screen transmission device. The data to be received includes screen data which is transmitted from the screen transmission device. When the communication controller 23 receives the screen data, it passes the received screen data to the screen data receiver 22.

The input device 24 is the device to allow an input by a user and sends a signal according to an operation input by the user to the user input analyzer 25. The type of the device is not particularly limited and a mouse and touch panel, pen input, keyboard or a combination thereof may be used.

The user input analyzer 25 converts the input signal which is sent from the input device 24 to a user input event on the computer screen which is displayed on the display 21 and passes it to the communication controller 23. The input event may be movement of a pointer, Up/Down of the right/left button of the mouse, Up/Down of a key or the like. The converted event is passed to the communication controller 23 to be transmitted to the screen transmission device.

Figure 4:
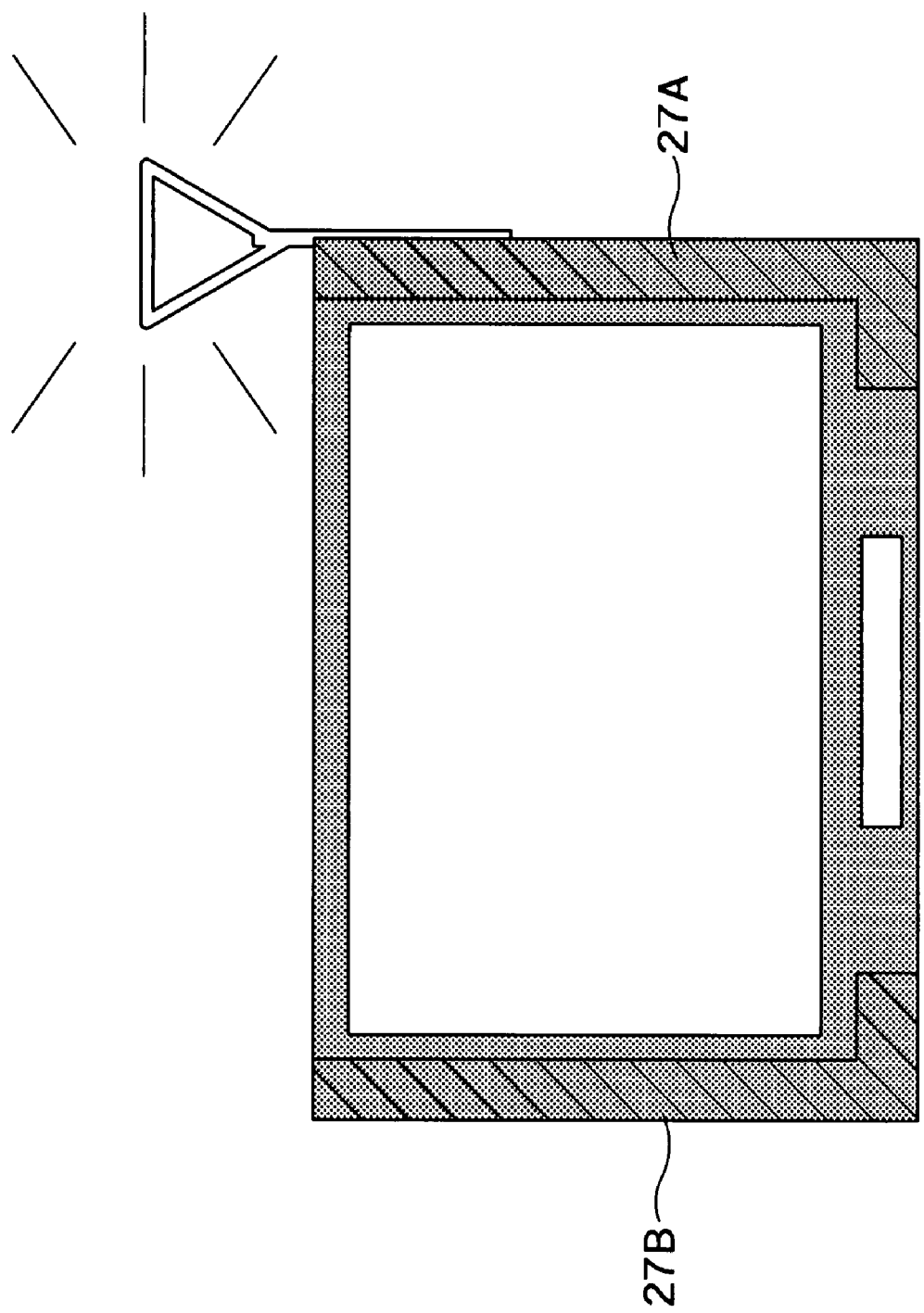
FIG. 4 shows the location of a pressure-sensitive sensor according to the first embodiment.

The pressure-sensitive device 26 is a so-called pressure sensor. The pressure sensor may be disposed, for example, in areas (peripheral part of the display) indicated by reference numerals 27A and 27B in FIG. 4. When the user holds the own device by hand, the pressure sensor reacts and transmits an ON signal to the hand-held state detector 27. On the contrary, when the user does not hold it by hand, the signal is turned OFF. When pressure-sensitive devices are disposed in the areas indicated by 27A and 27B in FIG. 4 and if the signal from the pressure-sensitive device disposed in the right area indicated by 27A can be detected in a manner distinguishable from the signal from the pressure-sensitive device disposed in the left area indicated by 27B, it is also possible to detect information on which side of the device the user holds or whether or not the user holds the device with both hands. Alternatively, if the pressure sensors are disposed in all areas around the display, it is possible to detect any part of the display the user holds. Alternatively, if it is preferable to detect the way of holding the device in detail, many highly pressure-sensitive devices may be disposed to use detection results of each pressure-sensitive device.

The hand-held state detector 27 receives the signal from the pressure-sensitive device 26 and judges whether or not the user currently holds the own device by hand. The hand-held state detector 27 is always monitoring the signal from pressure-sensitive device 26 at least while a screen is displayed on the display 21 and sends, when there is a change in the detection result of the hand-held state, the detection result to the screen transmission device through the communication controller 23. Alternatively, it may also store the detection result and transmit the information stored when there is a request from the screen transmission device.

A pressure sensor is used as the sensor to detect the hand-held state in this embodiment, but the sensor is not particularly limited to this. For example, it is possible to use a temperature sensor to detect the hand-held state from the difference in the temperature of the hand when the own device is held by hand and when not held by hand or use an acceleration sensor to detect the hand-held state by distinguishing a state in which the own device is stationary, placed on a desk or the like from a state in which the own device is held by hand and moving around. It is also possible to mount a camera in each screen display device and judge that the device is held by hand from an image taken by the camera if the user is included in the image. Alternatively, it is also possible to use a combination of these methods.

The screen data receiver 22 processes the screen data sent from the communication controller 23. If the received screen data is compressed data, it expands the data and overwrites screen data in an appropriate position of a frame buffer (not shown) which stores the whole screen in the screen data receiver 22. The screen data stored in the frame buffer is sent to the display 21 and displayed.

Figure 3:
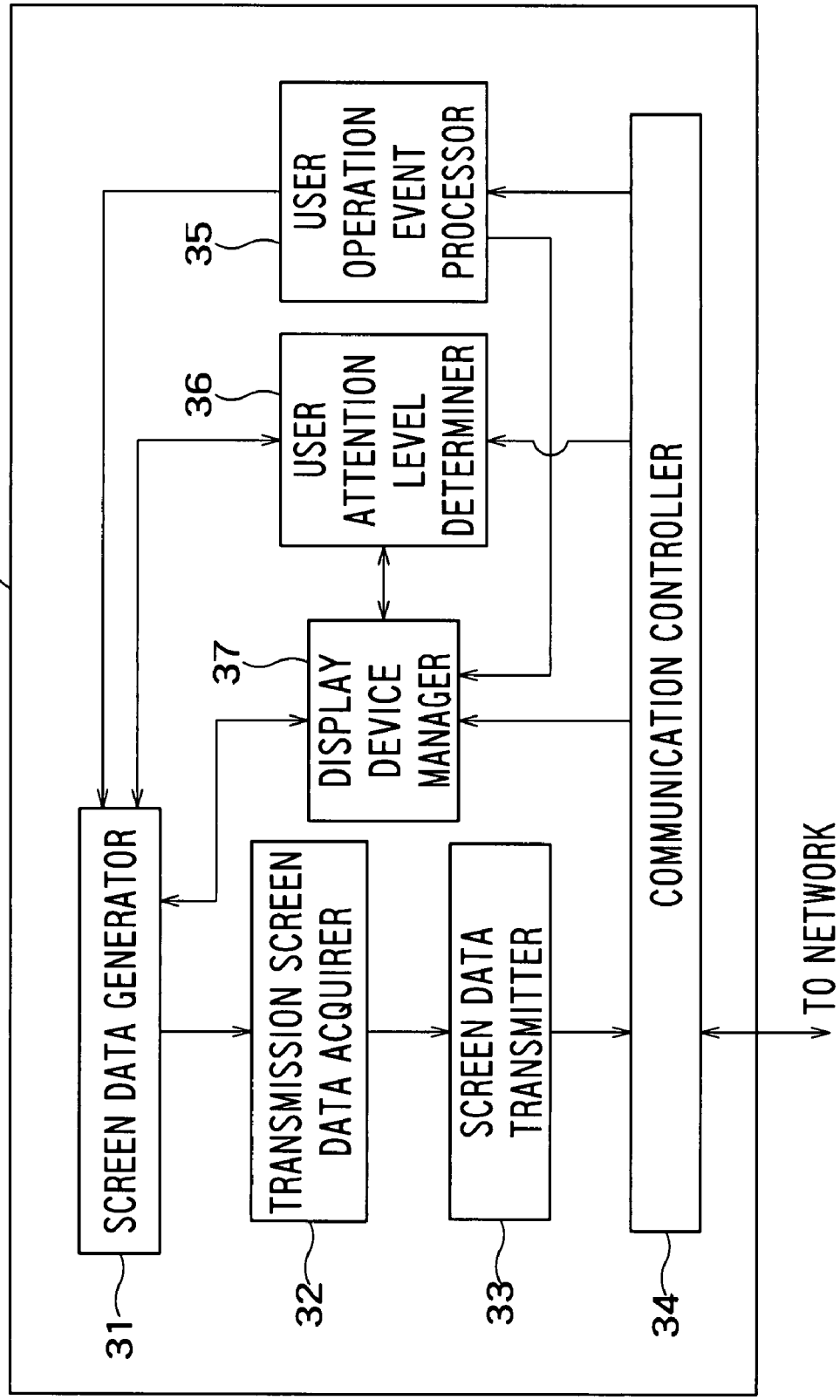
FIG. 3 shows an example of the block configuration of a screen transmission device according to the first embodiment.

FIG. 3 shows an example of the block configuration of the screen transmission device 11 of this embodiment. The figure shows a screen data generator 31, a transmission screen data acquirer 32, a screen data transmitter 33, a communication controller 34, a user operation event processor 35, a user attention level determiner 36 and a display device manager 37. These elements 31-37 may be implemented by causing a processor mounted in a computer device to execute a program stored in a computer readable medium.

The screen data generator 31 generates a so-called computer screen. It generally provides a frame buffer in a size which corresponds to the resolution of the screen for storing the latest screen to be displayed. When screens are generated for a plurality of displays, it provides frame buffers for each display and generates screens for each display. The generation of a screen itself is performed through coordination between an application, OS and display driver or the like and the image generated is written into the frame buffer. When informed of a connection of a new screen display device from the display device manager 37, the screen data generator 31 provides a frame buffer for the screen display device. That is, a frame buffer is provided for each screen display device connected. When shown on a display (not shown) of the own device, the written contents of the frame buffer are sent to the display. Upon receiving a user operation event from the user operation event receiver 35, the screen data generator 31 generates a screen (event screen data) according to the type of the event. For example, when the event is a pointer movement event, a pointer is redrawn at a position to which the pointer is moved. It also receives information on which display of the plurality of displays the user's attention is focused most from the user attention level determiner 36. When starting up to generate the screen of a new window to be started up, the screen data generator 31 draws the window on the screen of the display on which the user's attention is focused most.

The transmission screen data acquirer 32 acquires the position in the screen to be updated and drawing data. As the acquisition method, it may be possible to receive all update information from the screen data generator 31 and use the information as is. Alternatively, it may be possible to acquire the latest screen from the screen data generator 31 periodically, compare it with the screen acquired last time and thereby extract the updated part. In addition, a method of hooking drawing-related events such as screen updates used in the system, thereby monitoring which parts are updated and acquiring only the drawing data of the updated parts from the frame buffer at the screen data generator 31 can also be considered. The acquired screen data is sent to the screen data transmitter 33.

The screen data transmitter 33 transmits the update screen data sent from the transmission screen data acquirer 32 to the screen display device through the communication controller 34. The screen data transmitter 33 transmits the screen update position and the drawing data as one set of data. If not compressed, the data size of the drawing data becomes large, and therefore the drawing data may be compressed before being transmitted.

The communication controller 34 transmits data to a network or receives data from a network. The data is transmitted/received to/from the screen display device which becomes the destination device. Prior to a communication, the communication controller 34 receives a request for establishment of a communication channel from the screen display device and a communication channel is established. The communication controller 34 transmits the data sent from the screen data transmitter 33 to the screen display device whose communication channel has been established. The types of reception data include a user operation event and hand-held state information from the screen display device and these are sent to the user operation event processor 35 and the user attention level determiner 36 respectively.

The display device manager 37 manages the information on the screen display device being connected. When informed from the communication controller 34 that a connection with the screen display device has been established and passed user information received through the connection, the display device manager 37 carries out authentication. After succeeding in the authentication, the display device management 37 adds and registers the screen display device which has been newly connected to the display device list and informs the addition of the new screen display device to the screen data generator 31.

The user operation event processor 35 extracts event types such as movement of the pointer and Up/Down of buttons and auxiliary data according to each event (coordinates of the place to which the cursor movement event moves or the like) and sends it to the screen data generator 31.

The user attention level determiner 36 determines the display on which the user's attention is focused most out of the plurality of screen transmission devices used. As the method of determining the attention level, a method of regarding a display which is held by hand most recently as the display of the highest attention based on the hand-held state information received from the screen transmission device may be considered. The user attention level determiner 36 is equivalent, for example, to determiner.

It is also possible to use semi-automatic control as the control of the display position of a window to be newly started up instead of fully-automatic control. For example, it is possible to add such a menu as "To display held by hand" to a menu at the start-up of a new window or a menu of a window being displayed and surely display, when the user selects this menu "To display held by hand", a window on the display held by hand.

An example of the operation sequence when using the screen display device and the screen transmission device of this embodiment will be described. First, a sequence up to the completion of a connection between the screen display device and the screen transmission device will be described.

Figure 5:
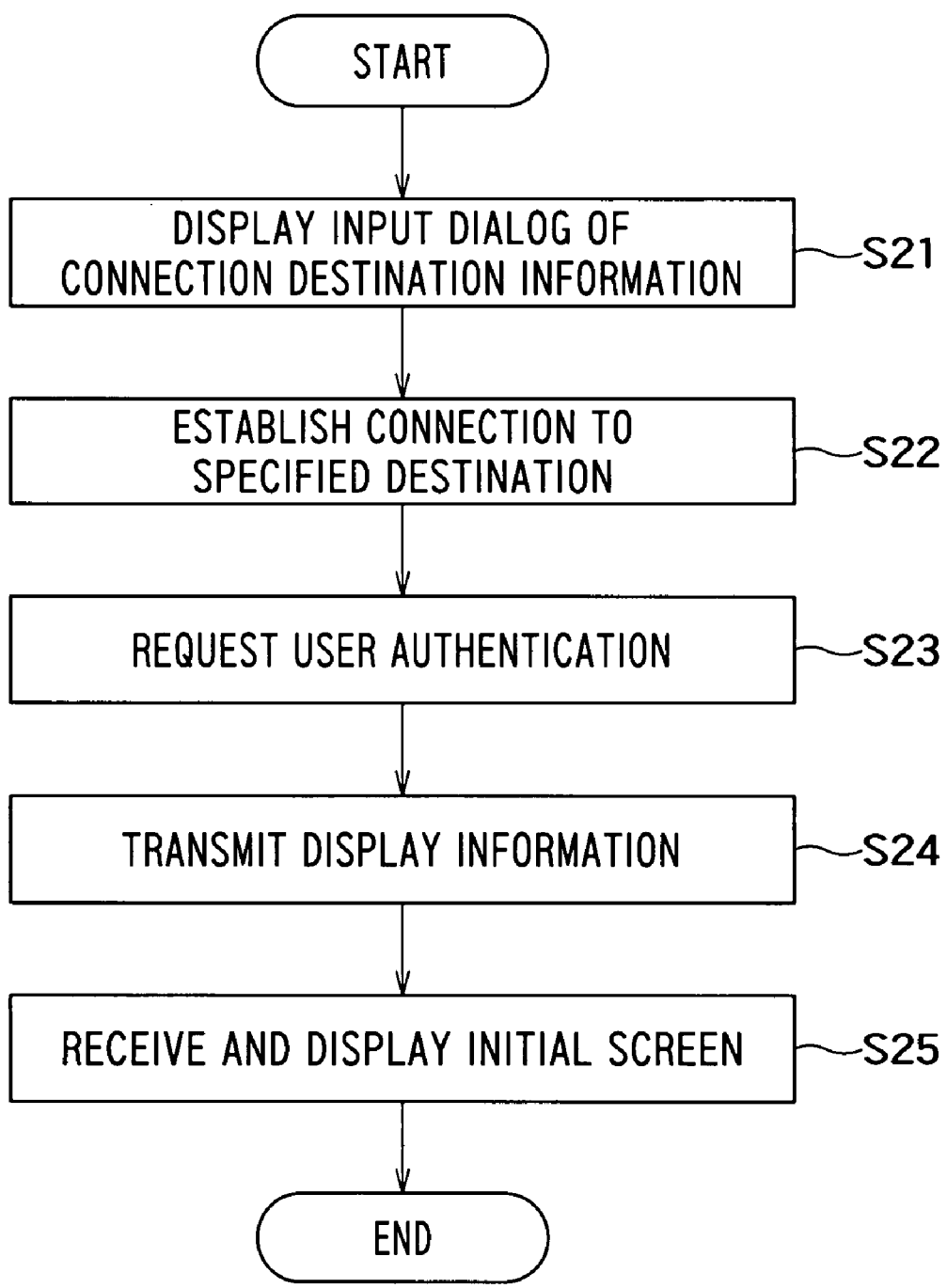
FIG. 5 is a flow chart showing connection processing of the screen display device according to the first embodiment.
Figure 6:
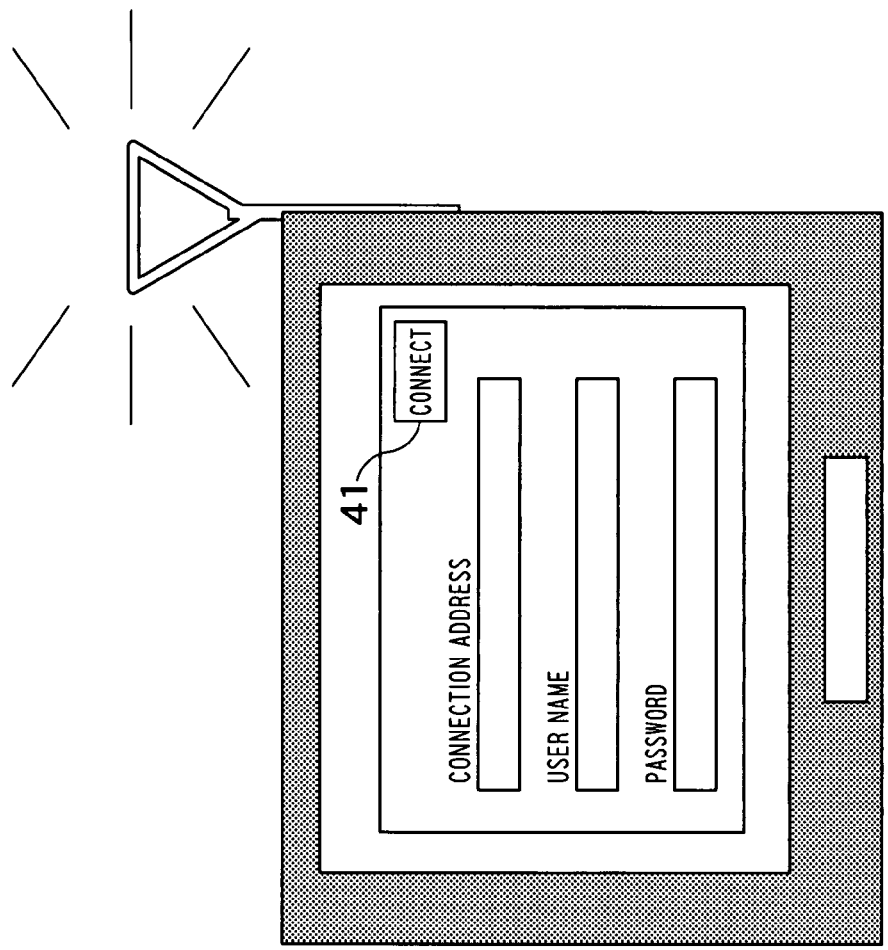
FIG. 6 shows a display example of an input dialog according to the first embodiment.

FIG. 5 is a flow chart showing processing up to the completion of a connection from the screen display device to the screen transmission device. First, when the user turns ON power to the screen display device, a dialog for a connection to the screen transmission device is displayed on the display of the screen display device (S21). FIG. 6 shows a display example of the dialog. Since this dialog should be displayed before being connected to the screen transmission device, it is desirable to allow the dialog to be created by the screen display device. The dialog is made to allow the address of the screen transmission device which becomes the destination to be connected, user name and password. The destination address to be inputted can be an IP address or host name, but it is not particularly limited. Next, when the user presses a connection button 41, the screen display device establishes a connection with the destination inputted to the dialog (S22). TCP/IP is generally used for the connection, but it is not limited to this. When TCP/IP is used, using a specific port number allows the screen transmission device which has accepted the connection to know that it is the intended connection of the screen transfer. After the connection is successfully established, the screen display device then transmits information on the user name and password (user authentication requesting information) using the established connection to request authentication of the user for the screen transmission device (S23). Upon receiving a request for transmission of display information which is transmitted as a result of successful user authentication at the screen transmission device, the screen display device transmits display information on the own device to the screen transmission device (S24). As a result, the screen display device displays an initial screen which is transmitted from the screen transmission device (S25) and with this, the initial connection sequence ends.

Figure 7:
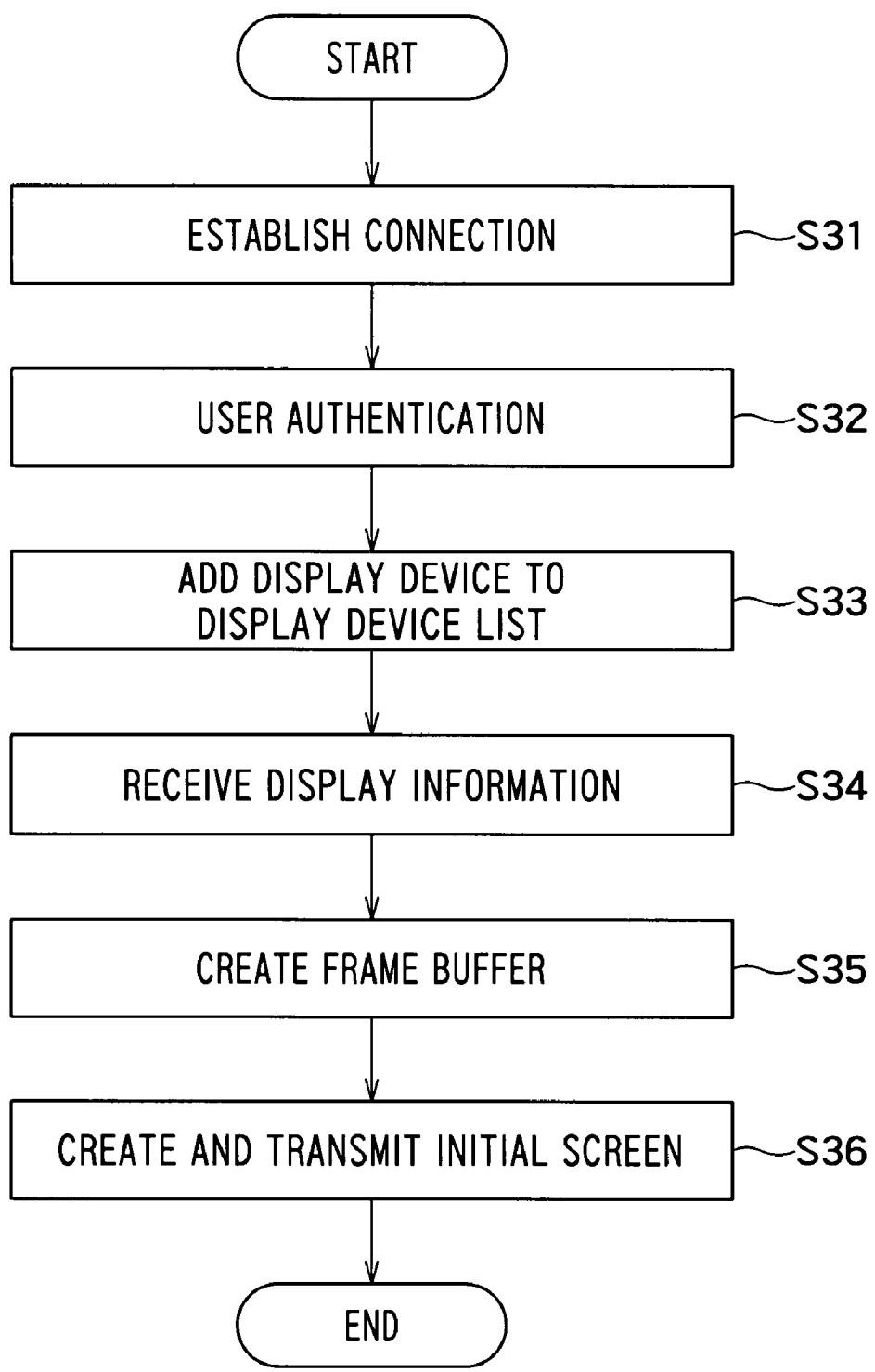
FIG. 7 is a flow chart showing connection accepting processing of the screen transmission device according to the first embodiment.
Figure 8:
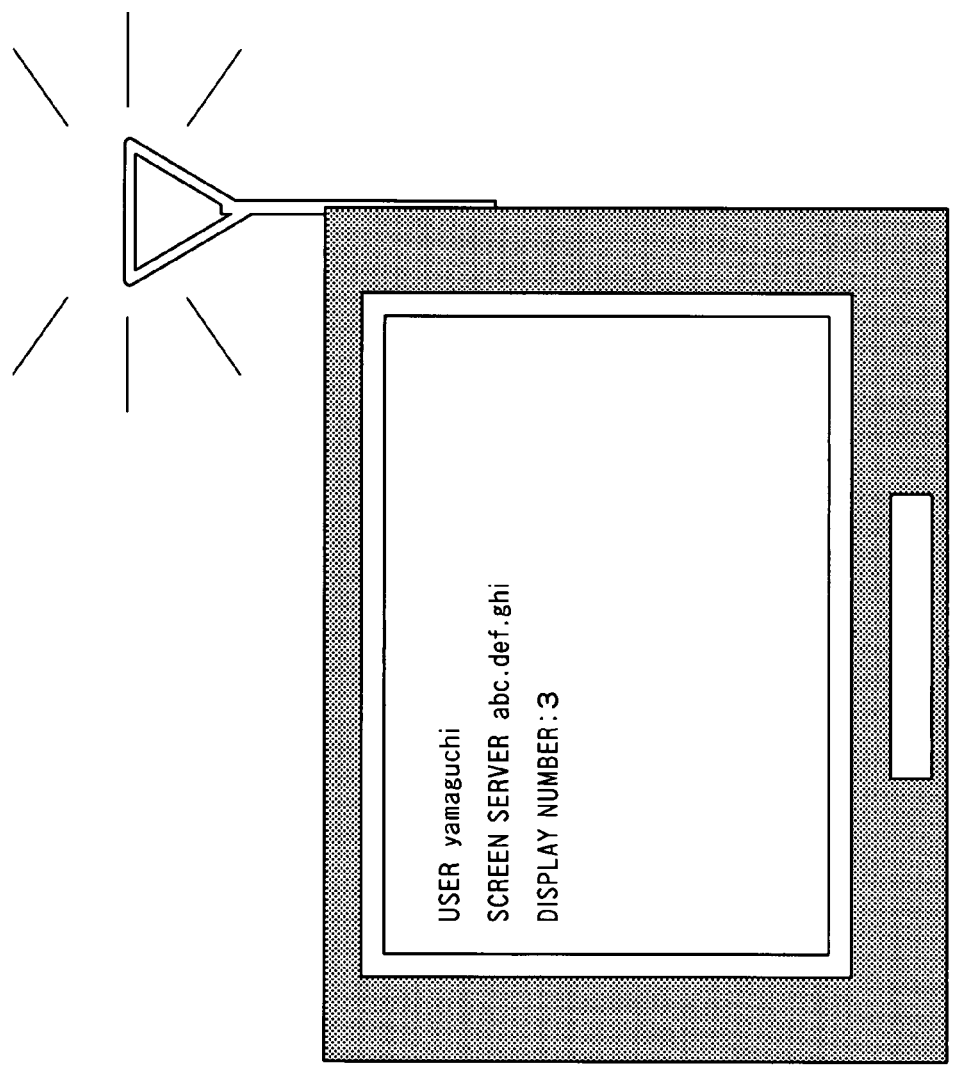
FIG. 8 shows an example of an initial screen according to the first embodiment.

FIG. 7 is a flow chart showing connection accepting processing by the screen transmission device from the screen display device. First, the screen transmission device establishes a connection for the data transmission/reception to/from the screen display device in response to a request from the screen display device (S31). Upon receiving user authentication requesting information through the established connection, the screen transmission device performs authentication of the user from the user name and password included in the received information (S32). After succeeding in the authentication, the screen transmission device adds the screen display device which is the sender to a display device list (S33). Examples of the display device list stored in the screen transmission device are shown in FIG. 9 and FIG. 10. In FIG. 9, the screen transmission device is connected with two screen display devices, and assigns ID "1" to the display device whose address is "xxx.xxx.xxx.xxx" and ID "2" to the display device whose address is "yyy.yyy.yyy.yyy." When a new connection with another screen display device is made, an unused ID is assigned and the screen display device is then registered. FIG. 10 shows a situation in which ID "3" is assigned to a display device whose address is "zzz.zzz.zzz.zzz" and the display device is registered. Next, the screen transmission device transmits a request for transmission of display information to obtain an attribute of the newly connected screen display device and receives the display information from the screen display device (S34). Upon receiving the display information, the screen transmission device provides a frame buffer according to the resolution of the screen and the number of colors included therein (S35), writes an initial screen indicating that the preparation has been completed into the frame buffer and transmits the initial screen to the screen display device (S36). FIG. 8 shows an example of the initial screen.

Figure 11:
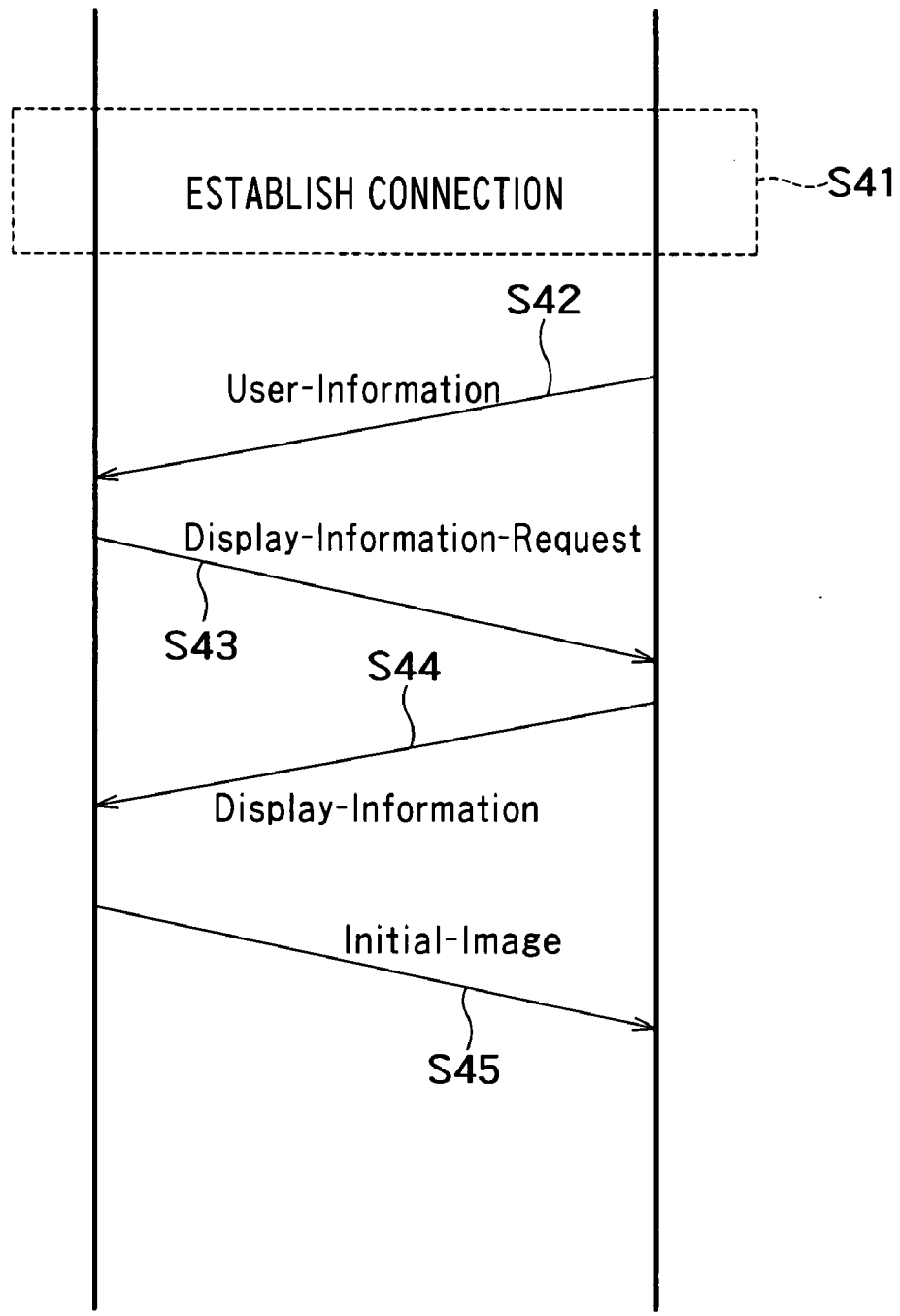
FIG. 11 shows an example of exchange of messages at a time of a connection according to the first embodiment.

FIG. 11 shows an example of messages exchanged between the screen transmission device and the screen display device after the start of a connection until the display of the initial screen is completed. After a connection establishment phase (S41), a User-Information message including the user name and password information which the user inputted from the screen display device is transmitted from the screen display device to the screen transmission device (S42). The screen transmission device authenticates the user based on the information on the user name and password included in the received User-Information message. Upon succeeding in the user authentication, the screen transmission device registers the screen display device in the display device list and transmits a Display-Information-Request message to the screen display device so as to obtain a display attribute (S43). Upon receiving the Display-Information-Request message, the screen display device transmits a Display-Information message which includes information on the display of the own device (S44). The information included in Display-Information may include resolution and the number of colors, but the information is not limited to them. The screen transmission device which has received the Display-Information message provides a frame buffer which matches the resolution and the number of colors included in the received message, creates an initial screen and sends the initial screen created to the screen display device as an Initial-Image message (S45).

Figure 12:
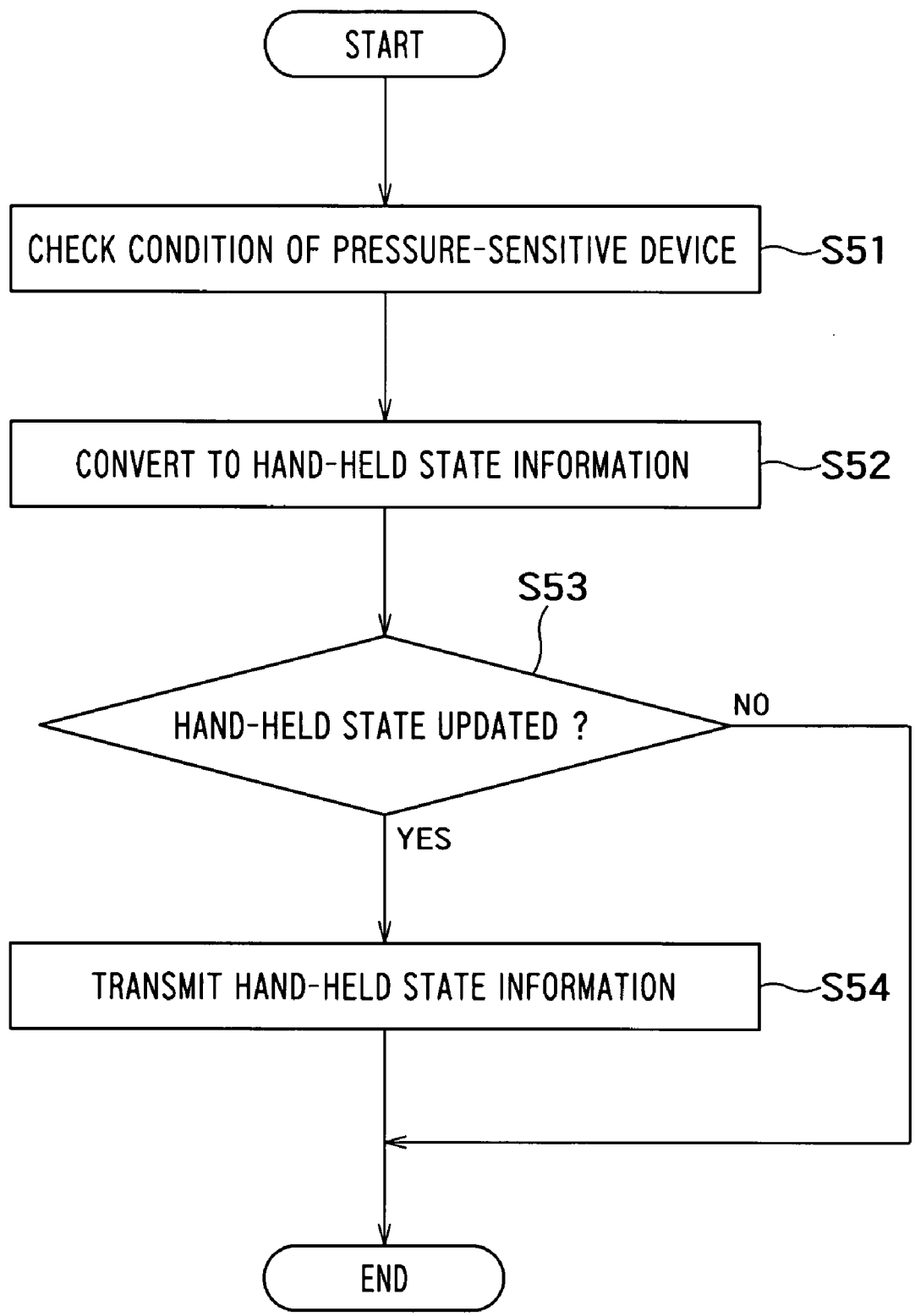
FIG. 12 is a flow chart showing hand-held state detection processing according to the first embodiment.

FIG. 12 is a flow chart showing the flow of detection processing of hand-held state information in the screen display device. This processing flow may be repeated periodically or an interrupt indicating a change of the signal from the pressure-sensitive device may be generated so that this processing flow is executed when the interrupt is generated. First, the condition of the pressure-sensitive device is checked (S51). As the method of arranging the pressure-sensitive devices, the pressure-sensitive devices may be disposed, for example, in the areas indicated by reference numerals 27A and 27B in FIG. 4, but the method is not particularly limited. The pressure-sensitive device is set in such a way that the signal is ON when the device is under pressure and the signal is OFF when the device is not under pressure. In the case of arrangement like FIG. 4, signals from the pressure-sensitive device in the right area indicated by 27A and the left area indicated by 27B are checked. More specifically, ON/OFF of the signal is checked to examine whether or not the device is under pressure. Next, the status of the checked signal is converted to hand-held state information (S52). For example, the signal status is converted to "not held by hand" when the signals detected from both the left and right sides are OFF, to "held by right hand" when only the signal detected from the right side is ON, to "held by left hand" when only the signal detected from the left side is ON, and to "held by both hands" when the signals detected from both the left and right sides are ON. The hand-held state information of the conversion result is compared with the hand-held state information at the time of the previous check (S53), the screen display device transmits (S54) new hand-held state information to the screen transmission device when there is a change (YES in S53) and ends the processing when there is no change (NO in S53).

Figure 13:
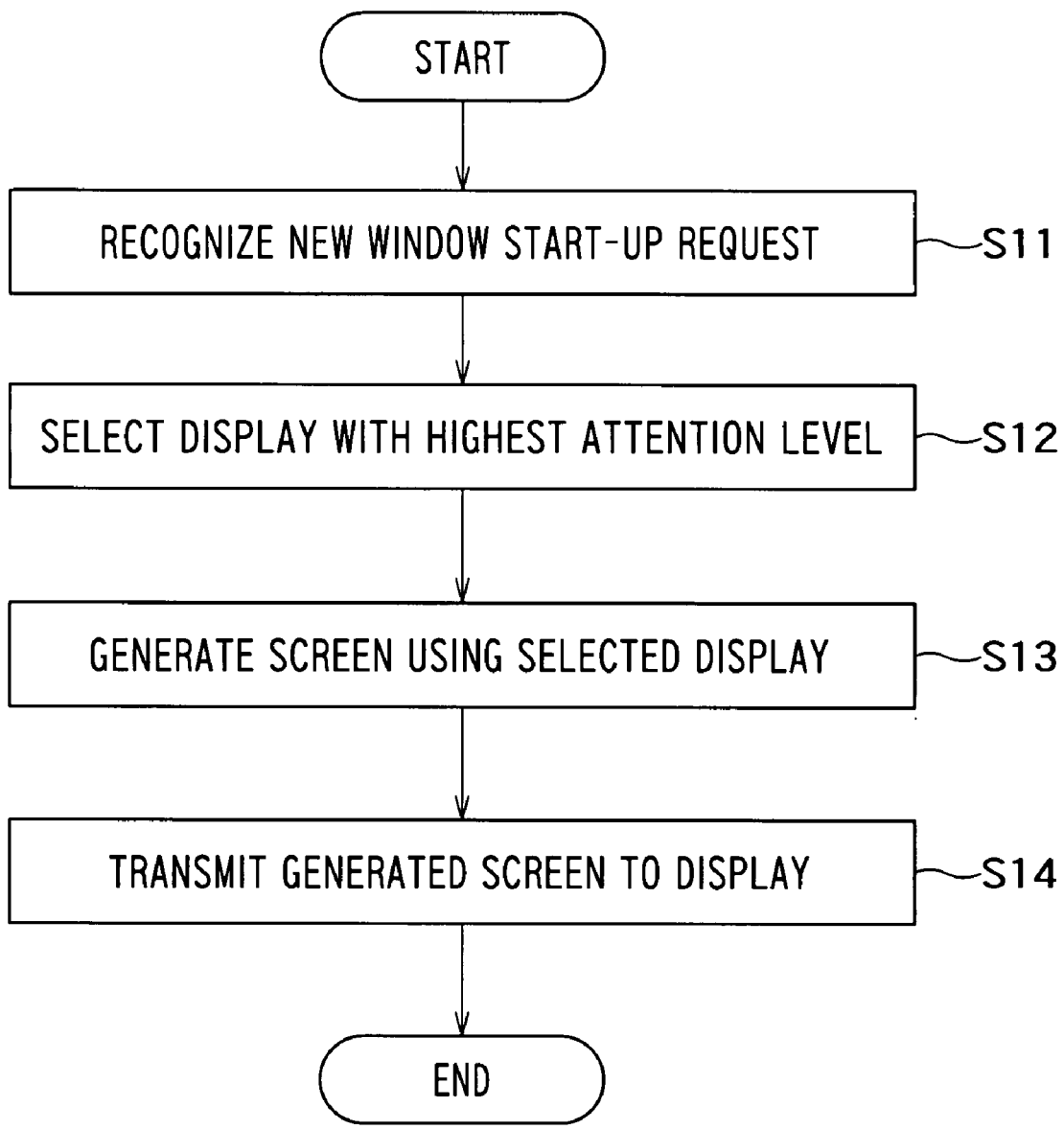
FIG. 13 is a flow chart showing processing at the start-up of a new window according to the first embodiment.

FIG. 13 is a flow chart showing the flow of processing executed by the screen transmission device when there is a request for starting up a new window from the screen display device. When it recognizes that there is a request for starting up a new window, for example, when the user opens a file using any one of the screen display devices (S11), the screen transmission device selects a display (screen display device) on which the user's attention is currently focused most (S12). The position of a window to be newly started up is determined for the selected display and a screen including the window to be newly started up is generated (S13). The screen generated is then transmitted to the display (S14).

Figure 14:
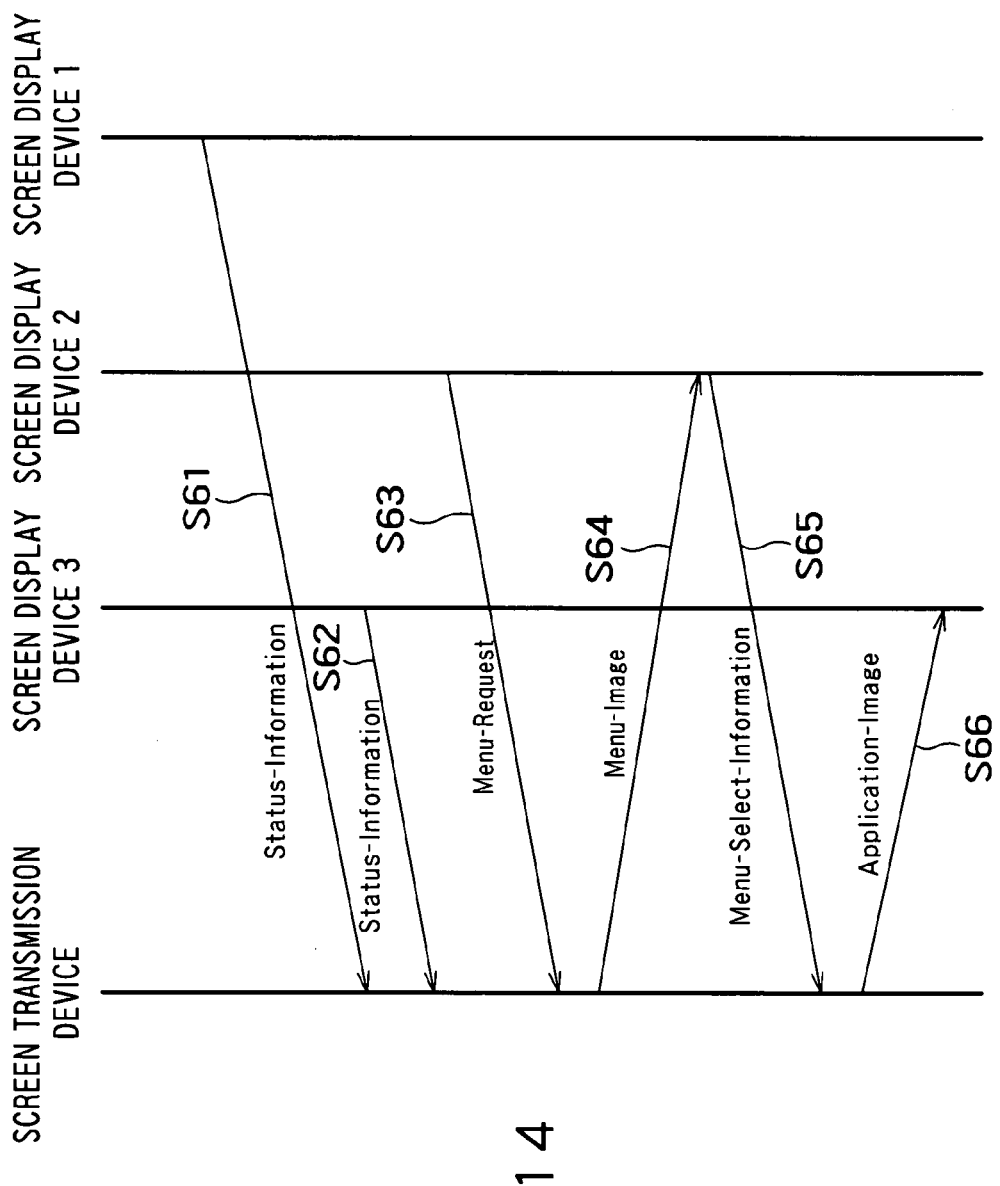
FIG. 14 shows an example of exchange of messages at the start-up of an application according to the first embodiment.
Figure 17:
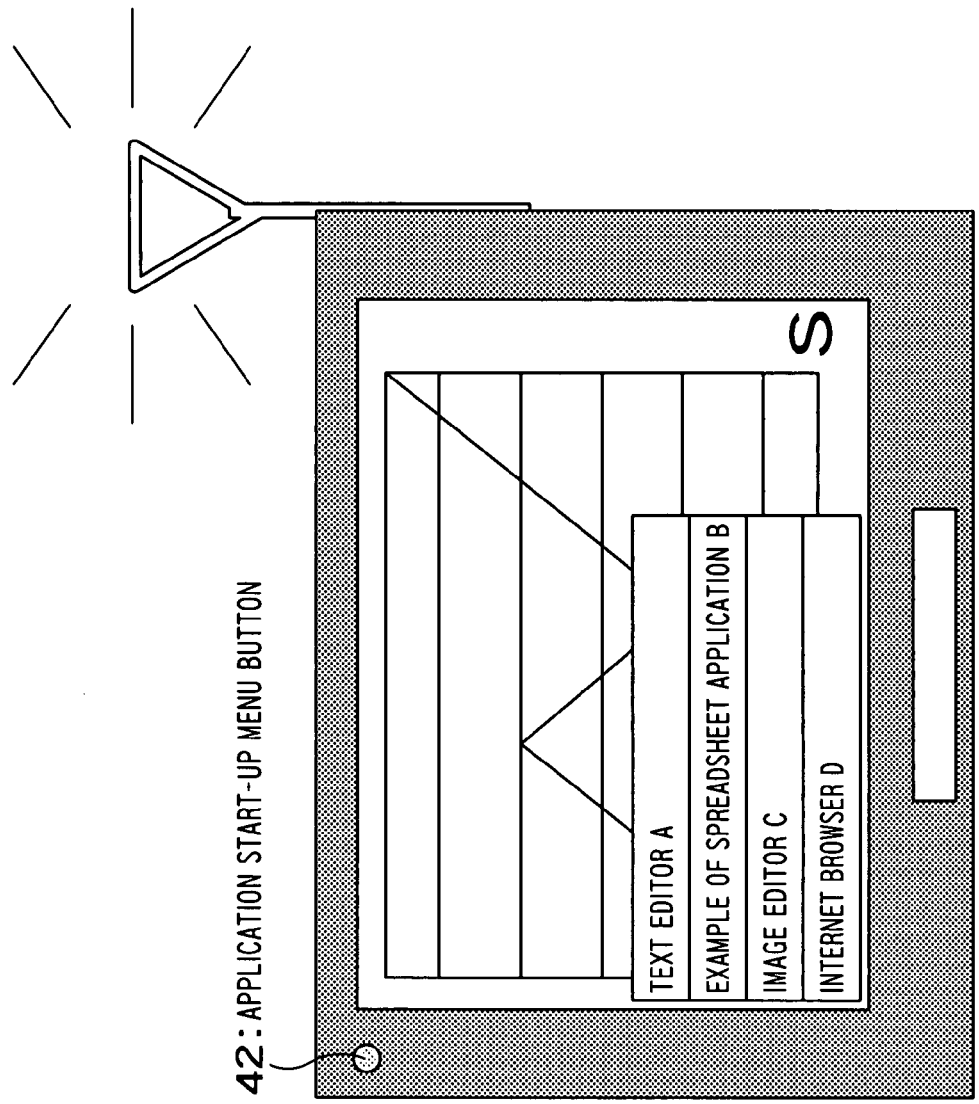
FIG. 17 shows an example of a menu list screen according to the first embodiment.
Figure 18:
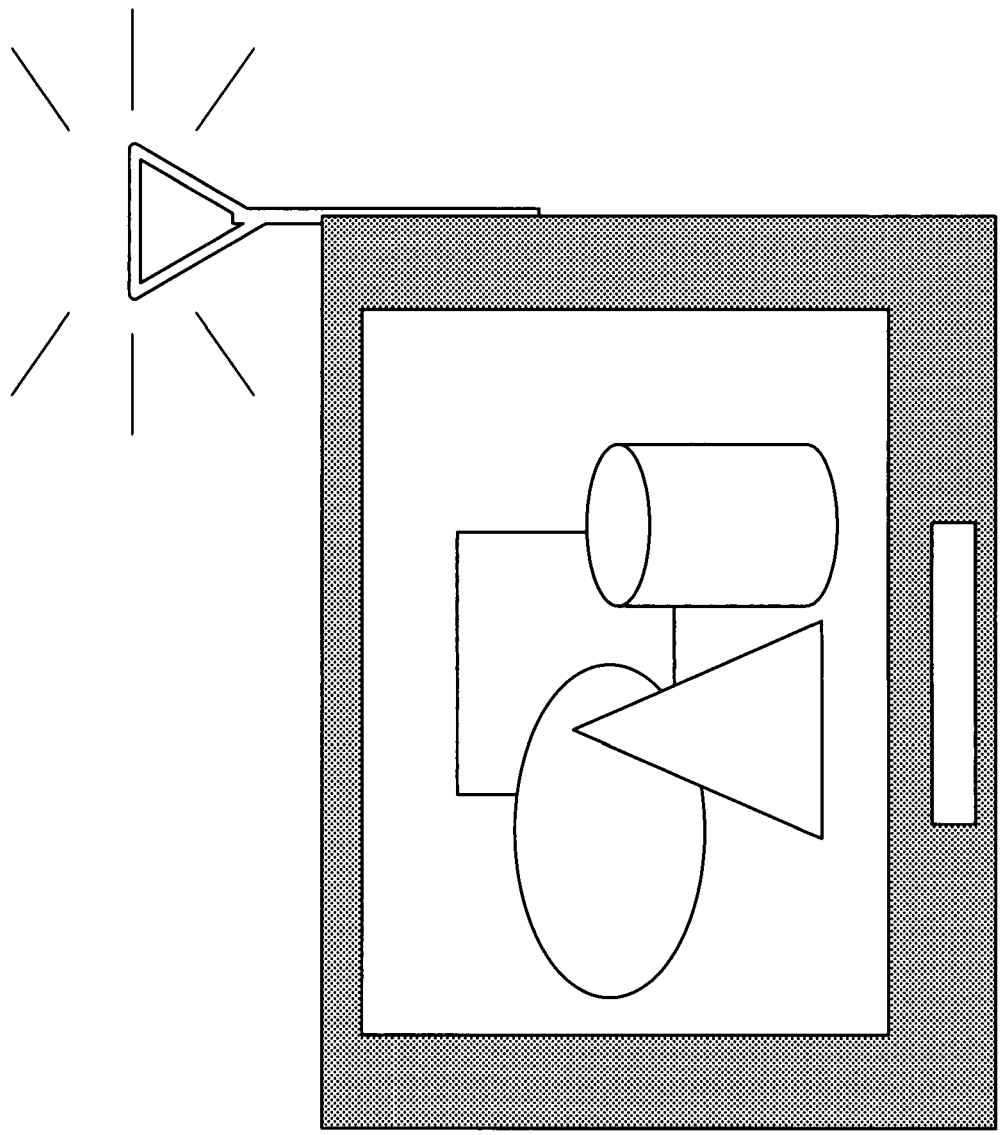
FIG. 18 shows a display example of an application according to the first embodiment.

FIG. 14 shows a message sequence from a state in which the screen display device 1, screen display device 2 and screen display device 3 have already been connected to the screen transmission device through the above described connection sequence (see FIG. 11) until a new application screen is displayed on the screen display device 3. Suppose the user holds the screen display device 1 by hand as an initial condition of this sequence. FIG. 15 shows the state of the display device list in the screen transmission device in this case. Suppose the user switches the screen display device held by hand from the screen display device 1 to the screen display device 3 here. Through the processing flow described in FIG. 12, a change in the hand-held state information is detected in the screen display device 1 and screen display device 3, a Status-Information message including new hand-held state information is transmitted from the screen display device 1 and screen display device 3 to the screen transmission device (S61, S62). That is, usage state information indicating a hand-held state is sent from the screen display device 3 to the screen transmission device (the screen transmission device receives usage state information indicating the hand-held state from the screen display device 3 later than the screen display device 1). Upon receiving the Status-Information message, the screen transmission device updates the display device list based on the hand-held state information included therein. FIG. 16 shows the display device list after the above described two Status-Information messages are received. Next, supposes that the user requests a display of an application start-up menu (event) from the screen display device 2 to start up a new application. As the method of requesting the display of the application start-up menu, for example, a method of providing an application start-up menu button in the screen display device may be considered. FIG. 17 shows an example of the screen display device with an application start-up menu button added. When this button 42 of the screen display device 2 is pressed, a Menu-Request message is transmitted from the screen display device 2 to the screen transmission device (S63). The screen transmission device which has received the Menu-Request message includes an application start-up menu screen in the Menu-Image message and transmits it to the screen display device 2 (S64). FIG. 17 above shows an example where the screen display device 2 receives the Menu-Image message and displays the application start-up menu. The user selects a menu using an input device such as a pen from the displayed menu. A Menu-Select-Information message including information on the selected menu (for example, position in the menu screen) is transmitted from the screen display device 2 to the screen transmission device (S65). The screen transmission device which has received the Menu-Select-Information message understands which application should be started up from the information included in the message. The screen transmission device then determines by which screen display device the application to be started up from now should be displayed through the processing shown in FIG. 13. When "whether or not the device is held by hand" is used as the attention level, the screen display device 3 is selected, the screen showing that a new application has been started up is written into the frame buffer for the screen display device 3 and an Application-Image message including the screen is transmitted from the screen transmission device to the screen display device 3 (S66). FIG. 18 shows an example where the application screen is displayed.

An example of a specific usage scene is shown. For example, suppose a list of documents to be checked is displayed on a screen display device A. Here, the user holds a screen display device B by hand and opens a document to be checked by the screen display device A. Then, the document is opened by the screen display device B which is held by hand without any selection as to, for example, from which screen display device the document is opened. Furthermore, when the user wants to see another second document while keeping the document just opened (first document) as is, the user puts down the screen display device B once, holds another screen display device C by hand and then opens the second document using the screen display device A. Then, the second document is automatically displayed on the screen display device C. It is also possible to easily check the second document while comparing it with the first document.

Second Embodiment

[Determining Display Destination According to Access Frequency]

A second embodiment will describe a method of using access by the user as the method for determining the degree of the user's attention to determine the location where an application start-up screen is displayed. Since the configurations of the screen transmission device and the screen display device are the same as those of the first embodiment, only differences in processing of each block will be explained. Upon receiving a user event, a user operation event processor 35 of the screen transmission device informs from which screen display device it received a user event in addition to the processing described in the first embodiment to a display device manager 37 as user event reception information. Upon receiving the user event reception information, the display device manager 37 writes information indicating that there was latest user access in an entry of a screen display device which sent the information in a display device list. FIG. 19 shows an example of the display device list which stores the latest user access information. FIG. 19 shows that there was user access to the screen display device of ID "3" most recently. Therefore, when displaying a new application screen, a user attention level determiner 36 selects the screen display device 3 as the display destination.

Furthermore, as another method for determining the user attention level, a method of determining the user attention level based on a user access history may also be considered. This method is the same as the method described above in that the display device manager 37 is informed of from which screen display device the user operation event processor 35 received a user event, but the display device manager 37 which has received the information does not store the information on the screen display device which was accessed by the user most recently, but counts the number of times each screen display device is accessed for a certain period of time. That is, the display device manager 37 increments the count by +1 every time a user event is sent from the screen display device. When the user attention level determiner 36 determines a screen display device on which a new application is displayed, it selects a device with the highest number of times of access. FIG. 20 shows an example of the display device list which reflects the latest user access information. Since FIG. 20 shows that the number of times of access to the screen display device of ID "1" is highest, the user attention level determiner 36 selects the screen display device 1.

Furthermore, as another method for determining the user attention level, a method of determining the user attention level based on the screen update frequency (screen generation frequency) of each screen display device may also be considered. When the screen data generator 31 generates an update screen for a certain screen display device, it informs that to the display device manager 37. The display device manager 37 which has received the information increments the screen update count of each screen display device by +1 every time it receives information. When the user attention level determiner 36 determines a screen display device on which a new application is displayed, it selects a device with the highest number of screen updates. FIG. 21 shows an example of the display device list which reflects the latest update frequency information. Since FIG. 21 shows that the number of screen updates of the screen display device of ID "2" is highest, the user attention level determiner 36 selects the screen display device 2.

A method of using hand-held state information together with the method described in this embodiment may also be considered. For example, when there is a display held by hand, the user attention level determiner selects the display held by hand as the display from which a new application should be started up assuming that the display has the highest attention level, but when there is no display held by hand, the attention level may be judged using the above described method.

Third Embodiment

[Concurrent Use of Write-Inhibit Attribute]

A third embodiment will describe a method using a write-inhibit attribute which indicates that a screen display device is write-inhibited as the method of determining a device on which an application start-up screen is displayed. Since the configurations of the screen transmission device and the screen display device are the same as those in the first embodiment, only differences in processing in each block will be explained.

Figure 22:
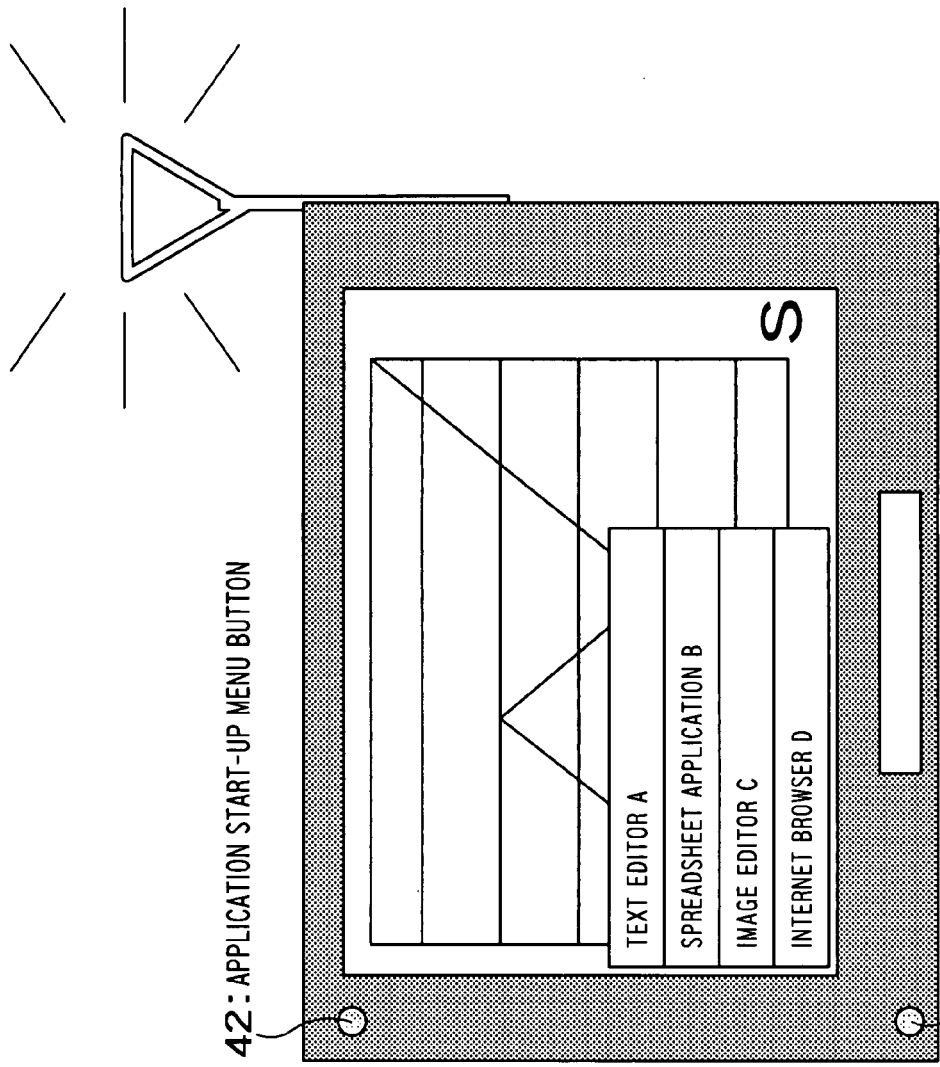
FIG. 22 shows a screen display device having a write-inhibit button according to the third embodiment.

FIG. 22 shows an example where a screen display device is furnished with a write-inhibit button with which the user requests the own device to be write-inhibited. FIG. 22 shows a situation in which an application start-up menu button 42 is pressed and an application start-up menu is displayed. Here, when the write-inhibit button 43 is pressed, the screen display device sends information that the own device is write-inhibited as a user operation event to the screen transmission device.

When the user operation event processor 35 receives the user operation event indicating that the write-inhibit button was pressed, the user operation event processor 35 informs this to the display device manager 37. The display device manager 37 writes the information that the device is write-inhibited in an entry of the screen display device in the display device list. FIG. 23 shows an example of the display device list which stores write-inhibit information. This example shows that the screen display device 3 is held by the user's hand and the write-inhibit button is pressed. After this, when the start-up of a new application is requested, the user attention level determiner 36 in the first embodiment would select the screen display device 3 as the display destination because it is held by hand, but since the screen display device 3 is set to be write-inhibited in this embodiment, the user attention level determiner 36 selects the screen display device 1 or screen display device 2.

In this way, when the user wants to have an application screen displayed on the screen display device held by hand, the user may start up an application without pressing the write-inhibit button. Furthermore, when the user wants to have a new application screen displayed on a different screen display device which is not held by hand, the user presses the button of the hand held screen display device when the application is started up, and can thereby have a new application screen displayed on the other screen display device.

What is claimed is:
1. A screen transmission device, comprising:
a receiver configured to receive, from each of a plurality of screen display devices, operation event information, the operation event information from each respective screen display device indicating one or more operation events inputted to the respective screen display device, the receiver being further configured to receive a message requesting start-up of a window from one of the screen display devices;
a processor configured to determine, from among the screen display devices, a screen display device for starting-up the window;
a screen data generator configured to generate event screen data based on the operation event information and to generate screen data of the window; and
a transmitter configured to transmit the event screen data to the screen display devices to which the operation events are inputted and to transmit the screen data of the window to the determined screen display device,
wherein the processor determines as the screen display device for starting up the window a screen display device from among the plurality of screen display devices for which the receiver has received operation event information a highest number of times in a certain time period.

2. The device according to claim 1, wherein
the receiver receives, from each respective screen display device, information indicating whether starting up a window is allowed at the respective screen display device, and
the processor selects as the screen display device for starting up the window one of the screen display devices at which starting up a window is allowed.

3. The device according to claim 1, wherein
each respective screen display device has a pressure-sensitive device configured to detect a pressure applied to the screen display device and the one or more operation events are triggered when the pressure-sensitive device detects pressure applied to the respective screen display device, and
the processor determines the screen display device for starting-up the window based on a screen display device that most recently detected pressure applied using the pressure-sensitive device.

4. A screen display method, comprising:
receiving, from each of a plurality of screen display devices, operation event information, the operation event information from each respective screen display device indicating one or more operation events inputted to the respective screen display device;
receiving a message requesting start-up of a window from one of the screen display devices;
determining, from among the screen display devices, a screen display device for starting up the window;
generating event screen data based on the operation event information, and screen data of the window; and
transmitting the event screen data to the screen display devices to which the operation events are inputted, and the screen data of the window to the determined screen display device,
wherein the determining includes determining, as the screen display device for starting up the window, the screen display device for which operation event information is received a highest number of times in a certain time period.

5. The screen display method according to claim 4, wherein
each respective screen display device has a pressure-sensitive device configured to detect a pressure applied to the screen display device and the one or more operation events are triggered when the pressure-sensitive device detects pressure applied to the respective screen display device, and
the screen display device for starting-up the window is determined based on a screen display device that most recently detected pressure applied using the pressure-sensitive device.

6. A non-transitory computer readable medium storing a computer program for causing a computer to execute instructions to perform steps comprising:
receiving, from each of a plurality of screen display devices, operation event information, the operation event information from each respective screen display device indicating one or more operation events inputted to the respective screen display device;
receiving a message requesting start-up of a window from one of the screen display devices;
determining, from among the screen display devices, a screen display device for starting up the window;
generating event screen data based on the operation event information, and screen data of the window; and
transmitting the event screen data to the screen display devices to which the operation events are inputted, and the screen data of the window to the determined screen display device,
wherein the determining includes determining as the screen display device for starting up the window a screen display device for which operation event information is received a highest number of times in certain period of time.

7. The non-transitory computer readable medium according to claim 6, wherein
each respective screen display device has a pressure-sensitive device configured to detect a pressure applied to the screen display device and the one or more operation events are triggered when the pressure-sensitive device detects pressure applied to the respective screen display device, and
the screen display device for starting-up the window is determined based on a screen display device that most recently detected pressure applied using the pressure-sensitive device.

* * * * *